US009369755B2

(12) United States Patent
Gintis

(10) Patent No.: US 9,369,755 B2
(45) Date of Patent: Jun. 14, 2016

(54) ANTENNA SUB-SYSTEM FOR RECEIVING MULTIPLE DIGITAL BROADCAST TELEVISION SIGNALS

(71) Applicant: Mark Alan Gintis, Boca Raton, FL (US)

(72) Inventor: Mark Alan Gintis, Boca Raton, FL (US)

(73) Assignee: New Choices Entertainment Incorporated, Thornhill, Ontario (CA)

(*) Notice: Subject to any disclaimer, the term of this patent is extended or adjusted under 35 U.S.C. 154(b) by 0 days.

(21) Appl. No.: 14/641,366

(22) Filed: Mar. 7, 2015

(65) Prior Publication Data

US 2015/0201232 A1    Jul. 16, 2015

Related U.S. Application Data

(63) Continuation-in-part of application No. 14/479,280, filed on Sep. 6, 2014.

(60) Provisional application No. 61/875,649, filed on Sep. 9, 2013.

(51) Int. Cl.
| | | |
|---|---|---|
| *H04N 5/44* | (2011.01) | |
| *H04N 5/50* | (2006.01) | |
| *H04N 21/426* | (2011.01) | |
| *H04H 60/27* | (2008.01) | |
| *H04N 5/775* | (2006.01) | |

(52) U.S. Cl.
CPC ........... *H04N 21/4263* (2013.01); *H04H 60/27* (2013.01); *H04N 5/4401* (2013.01); *H04N 5/775* (2013.01); *H04H 2201/60* (2013.01)

(58) Field of Classification Search
CPC ......... H04N 5/44; H04N 5/50; H04N 5/4401; H04N 21/4263; H04N 21/6143; H04N 21/4147; H04N 21/4334; H04N 21/438; H04N 21/43622; H04N 21/43635; H04N 21/43637
USPC .................................................. 348/725, 731
IPC ............................................... H04N 5/44, 5/50
See application file for complete search history.

(56) References Cited

U.S. PATENT DOCUMENTS

| | | | |
|---|---|---|---|
| 6,647,015 B2 | 11/2003 | Malkemes et al. | |
| 7,034,893 B2 | 4/2006 | Liu et al. | |
| 7,369,823 B2 | 5/2008 | Oiwa | |
| 8,340,047 B2 | 12/2012 | Nakano et al. | |
| 8,350,970 B2 | 1/2013 | Birkett et al. | |
| 2004/0252243 A1* | 12/2004 | Stewart | H04N 5/44 348/725 |
| 2010/0105318 A1 | 4/2010 | Fitzpatrick et al. | |
| 2011/0250926 A1 | 10/2011 | Wietfeldt et al. | |
| 2012/0133561 A1* | 5/2012 | Konanur | H01Q 1/2266 343/702 |

FOREIGN PATENT DOCUMENTS

EP    1677436 A2    7/2006

* cited by examiner

*Primary Examiner* — Sherrie Hsia
(74) *Attorney, Agent, or Firm* — Berggren Law Offices, LLC; William R Berggren; Stephen F Wolf

(57) ABSTRACT

An antenna sub-system apparatus for receiving a plurality of over the air television broadcast signals comprising a plurality of antennas packaged together capable of receiving broadcast signals, each antenna capable of receiving independent signals, and an active electronics assembly, wherein the antennas are secured together, include a coupling means for connecting to the active electronics assembly, and, a plurality of amplifier/tuner elements, one for each antenna.

13 Claims, 1 Drawing Sheet

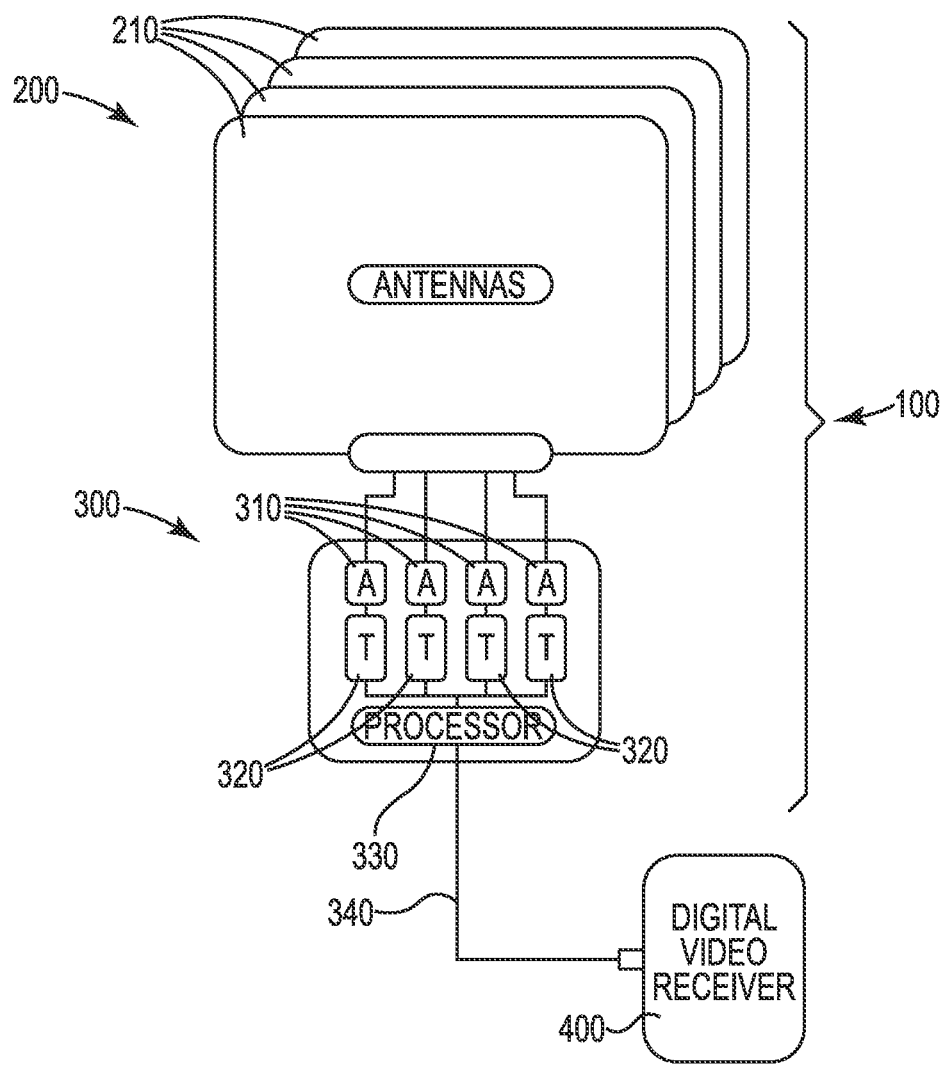

ANTENNA SUB-SYSTEM FOR RECEIVING MULTIPLE DIGITAL BROADCAST TELEVISION SIGNALS

FIELD OF THE INVENTION

The present invention related generally to antenna and tuner systems, and more particularly to an antenna tuner sub-system that receive multiple digital broadcast television (TV) signals for the purpose of viewing and/or recording to storage media for timely or time shifted TV entertainment viewing.

BACKGROUND OF THE INVENTION

A variety of networks including ABC, CBS, CW and USA, to name just a few, are broadcasting their programming digitally in 1080i which is capable of being captured for minimal or no charge by an antenna. The use of antennas has become rare, as consumers have increased their demands for customized options, channels, and programming that require the splitting of the incoming digital broadcast television signal into at least two channel signal, both for simultaneous recording for later time delayed playback or the recording of a first channel signal for time delayed playback at the same time as watching a different second channel. The signal splitting has resulted in decreased signal strength or increased noise for each channel signal at the viewing level. This has kept the various digital and satellite television service providers thriving as they provide options like multiple digital video recording capabilities at the household level. There was no way to cost effectively provide households the ability to watch television broadcast directly by the networks in 1080i and simultaneously record multiple television shows.

Furthermore, while the networks discussed provide true high definition television broadcast in 1080i, large cable and satellite providers are only able to offer service between 720 and 1080i.

SUMMARY OF THE INVENTION

This invention addresses that need to receive multiple over the air digital broadcast signals at the same time. The invention comprises an apparatus and a method that does not involve splitting of the digital broadcast signal. The apparatus is an antenna sub-system apparatus for receiving a plurality of over the air digital broadcast television channel signals. The apparatus comprises a passive antenna assembly and an active electronics assembly with no signal splitting elements for splitting the digital broadcast television signal into at least two signals to allow for the selectively different simultaneous use of each in a different manner. The passive antenna assembly comprises at least two antennas packaged together without interaction with any signal splitting elements and configured to receive over the air digital broadcast television signals, each antenna able to receive an independent over the air digital broadcast television signal. The active electronics assembly is configured to communicate with the at least two antennas and a digital video receiver, and comprises an amplifier for each antenna in communication with the antenna, a tuner connected to each amplifier and a processing unit configured to be in communication with all of the tuners and configured to convey the digital broadcast television signal from each tuner independently and simultaneously to at least one digital video receiver.

The method is a method of recording multiple over the air television broadcast signals and comprises four steps. The first step is providing an over the air digital broadcast television signal containing at least two channels. The second step is providing the antenna sub-system apparatus for receiving a plurality of over the air digital broadcast television signals to separate the digital broadcast television signal into at least two channels without the use of signal splitting elements and comprising a passive antenna assembly and an active electronics assembly as described above. The third step is receiving at least one digital video receiver that is in communication with all of the tuners of the active electronic assembly. The fourth step is receiving at least two independent over the air digital broadcast television signals. The fifth step is conveying at least one of two over the air digital broadcast television signal to a digital video receiver to display to record for time delay viewing.

The invention has two parts: the passive antenna assembly and the active electronics assembly. This summary defines three items. The above two parts and the synergistic performance of the two parts acting as a third item with performance better than the expected sum of the first two parts.

The invention has at least two benefits. First, the present invention allows a household cost effectively to watch television broadcast directly by the networks in 1080i and simultaneously record multiple television shows. Second, the present invention not only allows for the viewing of cost effective television broadcast directly by the network, but also provides better clarity and sharpness of the show.

BRIEF DESCRIPTION OF THE DRAWINGS

FIG. 1 is a schematic diagram of an embodiment of an antenna tuner sub-system of the present invention.

While the invention is amenable to various modifications and alternative forms, specifics have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

The invention has two parts: the passive antenna assembly and the active electronics assembly. This summary defines three items. The above two parts and the synergistic performance of the two parts acting as a third item with performance better than the expected sum of the first two parts.

It is believed by the inventor that there is no prior art in the antenna field of design or tuner field of design because it is not possible to buy the invention in any form and many manufacturers of similar components have neither heard of such parts or items nor do they have any idea(s) of how to solve the problem(s) associated with the design of a multi-tuner antenna array, even though they are (all) in a business where such a design breakthrough would be very profitable.

The problem is that Digital Video Receivers (DVRs) that receive cable-based Quadrature Amplitude Modulation (QAM), used in Internet Protocol (IPTV), or satellite-based) signals, record two to six channels are common place. This is a relatively easy task because there is more than the necessary QAM (or, other) TV signal strength on the cable to split it two to six ways and tune adequately, each channel with a separate tuner. Digital Over-the-Air ("OTA") TV, also known as broadcast TV, is different. Digital OTA antennas pick up a very small signal, usually close to their noise level, which is then sent to an amplifier to raise the signal level and lower the noise level. That processed signal is then sent to a tuner. If there is a need to record two channels at once or record one while watching another at the same time then the signal must be split in two. Splitting can be done before or after amplification, however the results are the same. The signal level is split in half or less and/or the noise is doubled or worse. If four recordings are to be made simultaneously then the same problem persists only worse. In general, for the case of four channels, less than one quarter of the signal is available and/or more than four times the noise is present. In some implementations there is less than one eighth of the signal and eight times as much noise. If the reception was fringe area reception then splitting the signal in half or in quarters makes the signal unusable. If the reception was strong then splitting the signal will cause the number and severity of reception artifacts to be higher. Under all circumstances the pairing of anything other than one antenna with one amplifier and one tuner is always less than optimal and sometimes makes the performance unusable.

In brief summary, the solution is to pair only one antenna with only one amplifier and only one tuner so that signal splitting is not required. This mostly solves the problems stated above but is completely impractical. The implication of this solution is that there are, for example, four antennas, each with a coax cable to an amplifier and then a connection of the amplifiers to the tuners and all of the above to electrical power and to the DVR as illustrated in FIG. 1.

A novel solution to avoiding the obvious jumble of wire and electronic parts requires a two-fold approach. First, the multiple antennas must be made and look like one and the associated amplifiers and tuners and cables must be integrated into the antenna packaging optimally with only one cable from the "Integrated Antenna Array" to the DVR.

Until recently, there was no motivation to solve this problem. Multiple DVRs cost too much. National Television System Committee (NTSC), Phase Alternating Line (PAL), and Sequential Color with Memory (SECAM) analog color encoding television systems were of poor quality. High Definition OTA (HD OTA) digital video with superior quality has mostly been ignored because of cable TV availability. However with the advent of the over $200 per month cable TV invoice in the United States ($2,400 per year, $26,400 for 11 years—the average cost and life of an automobile!), there is no longer lack of motivation to offer an alternative at any reasonable price.

Until recently, there was no antenna design that allowed multiple antennas to be made to look and be assembled and be packaged as one. The size of usable TV antennas made them too large. The size of usable TV antennas made them interact with each other so that the array did not work as the individual antennas did. Cellular phone technology and market demand have now taught antenna designers how to build the wideband, small and flat antennas that are necessary to make phones that fit in our pockets work and work well. A few antenna companies have started to make flat, almost omnidirectional, wide-band Very High Frequency (VHF) to Ultra High Frequency (UHF) antennas for OTA TV viewing. These antennas act as ideal single channel elements in a wide-band, flat and small, multi-antenna array. The multi-antenna array is manufactured by "printing" each antenna physically on top of the other antenna array elements. Common RF engineering concepts would probably cause the antenna designer to mistakenly think that overlaying multiple antennas would cause one antenna to shield the next in the stack. This might be true if all the antennas were being used to tune the same channel. However, there is nearly no reason to ever do this. Each antenna is usually used to receive a different channel, so any resonance feedback from its respective amplifier and tuner combination has nearly no effect. In actual practice, using a Sencore SLM 1453 signal strength meter, measured results are that the stacking of these antennas cause a slight enhancement of the signal (on the order of 1 to 2 db). No explanation of this phenomenon is either offered or relevant to this summary of this invention.

The apparatus comprises a passive antenna assembly and an active electronics assembly with no signal splitting elements for splitting the digital broadcast television signal into at least two signals to allow for the selectively different simultaneous use of each in a different manner. The passive antenna assembly comprises at least two antennas packaged together without interaction with any signal splitting elements and configured to receive over the air digital broadcast television signals, each antenna able to receive an independent over the air digital broadcast television signal. The active electronics assembly is configured to communicate with the at least two antennas and a digital video receiver, and comprises an amplifier for each antenna in communication with the antenna, a tuner connected to each amplifier and a processing unit configured to be in communication with all of the tuners and configured to convey the digital broadcast television signal from each tuner independently and simultaneously to at least one digital video receiver. A digital broadcast television signal generally comprises multiple channel signals each corresponding to a specific channel. Currently, if two channels are desired to be used simultaneously either both for recording or one for recording and the other for viewing, the digital broadcast television signal must be split in two signals each tuned to select the different desired channel signal. This splitting degrades the resulting image that is being recorded or watched as discussed above. Because the invention has at least two antennas, there is no need for splitting the incoming digital broadcast television signal in to two signals so each can be individually selectively tuned for a specific channel signal. As a result of the lack of signal degradation that would have been caused by passing through the digital broadcast television signal through a splitter signal splitters, the resolution of the signal that is broadcast is at least similar to that of the signal that is recorded or viewed if only one channel were able to be transmitted to only one DVR. Various factors can affect resolution such as, for example, number of connections between the digital broadcast television signal and the DVR. However, splitting the incoming digital broadcast signal into two separate signals to achieve simultaneous access to two television channels at the same time is the most disruptive factor. The invention eliminates that factor by not using or requiring the use of splitters to actively access two channels simultaneously from the digital broadcast TV signal. This effect is even more pronounced when dealing with more than two channels simultaneously.

Until recently, there have been few companies that were willing to invest the effort and outrageous expense to challenge how entertainment would be delivered to the average consumer. With over 100 million households wanting new choices that they can make about how their entertainment is delivered for their viewing pleasure, and, especially considering the public vested interest in the free Federal Communication Commission (FCC) licenses that the TV entertainment industry has been endowed with, to broadcast OTA TV, it is now time for a practical technical solution to the multi-antenna, multi-tuner, multi-DVR TV entertainment problem.

Multiple flat TV antennas are made with each of their feed wires at a different angle so that an integrated set of multiple amplifiers and multiple tuners can be connected directly to the antenna substrate and each of the tuners can be connected to an integrated and powered hub all integrated and packaged together. An additional synergy is generated by the cables from the antennas to the amplifiers and the cables from the amplifiers to the tuners being omitted. Every cable and every connection is responsible for additional signal loss. Only one cable need be connected from the hub to the viewing device. The one cable carries multiple tuned TV signals and power for all the "Integrated Antenna Array" components.

In an embodiment of the invention described for illustration, a passive antenna assembly comprises Four Winegard Company FL-5000 FlatWave HDTV Indoor Digital Flat Antenna elements, made in the USA, that are taped together. The antennas may also be laminated or otherwise secured together. The antennas of the passive antenna assembly are attached to an active electronic assembly that comprises amplifiers and tuners and a hub assembly. Each of the four antennas is attached to each of 4 amplifier units that are in turn attached to each of 4 tuners. One such amplifier and tuner arrangement is a quad tuner card with amplifier sold as a KWorld UB435-Q tuner. These tuners, in turn, are connected, including power, to a 5 Gigabit per second, USB 3.0 powered hub, which, in turn, is connected through one USB cable to the New Choices Entertainment (NCE) Set Top Component TV device. The NCE component processes that multiple set of signals to either be recorded or displayed on the TV or both.

An example of the above embodiment of the invention is illustrated in FIG. 1, a schematic diagram of an embodiment of an antenna tuner sub-system of the present invention. An antenna sub-system (100) is shown comprising a passive antenna assembly (200) and an active electronic assembly (300), and is attached to a digital video receiver (400). Four antennas (210) are individually attached to their own amplifier (310) and tuner (320). The four tuners are attached to a processing unit (330) that is, in turn, connected by a connecting element (340) to digital video receiver 400.

The present invention uniquely combines at least two antennas, preferably four antennas as shown, together as a single unit. Preferably, these antennas are laminated or otherwise secured together. Each antenna includes a coupling means for connecting with an active electronics assembly.

The active electronic assembly comprises (1) a collection of amplifiers, one for each antenna, (2) a collection of tuners, one for each amplifier, and (3) a processing unit connected to all tuners. Typically an amplifier and a tuner appear together on a tuner card but may be separate or bunched together so that each amplifier is associated with its own tuner. At least two, but preferably four tuner cards are designed within the assembly for accepting the coupling means. Each tuner card is in communication with an amplifier unit. There are an equal number of antennas and tuners, such that each antenna communicates with one tuner. The tuner cards and amplifier units are collectively coupled to a processing unit.

The processing unit is configured to receive the multiple independent digital video signals from the tuners and convey them to at least one digital video receiver. In its simplest form one embodiment of the processing unit is a USB Hub electronically attached to all of the tuners individually. In another embodiment, the processing unit also is configured to receive digital video signals from satellite or cable sources.

The connecting elements are configured to convey at least two independent digital video signals from the processing unit to one or more digital video receivers. Connecting elements can include, for example, Wi-Fi, High Definition Multimedia Interface (HDMI), Digital Visual Interface (DVI), Bluetooth, Thunderbolt by Apple, FireWire, Ethernet, and mesh networks.

DVRs are elements that are configured to receive at least two digital video signals that are conveyed from the processing unit. They include, for example, elements designed to display the digital video signals, elements designed to store the digital video elements for later display, or elements designed to both display one digital video signal while storing at least one digital video signal for display at a later time. Digital video receivers include, for example, cloud based storage applications; hardware based storage devices such as, for example, computers, digital video disks, and digital video recorders; and smart storage and display devices such as televisions, monitors, computers, smart phones, and computer tablets.

The method is a method of recording multiple over the air television broadcast signals and comprises five steps. The first step is providing an over the air digital broadcast television signal containing at least two channels. The second step is providing the antenna sub-system apparatus for receiving a plurality of over the air digital broadcast television signals to separate the digital broadcast television signal into at least two channels without the use of signal splitting elements and comprising a passive antenna assembly and an active electronics assembly as described above. The third step is receiving at least one digital video receiver that is in communication with all of the tuners of the active electronic assembly. The fourth step is receiving at least two independent over the air digital broadcast television signals. The fifth step is conveying at least one of two over the air digital broadcast television signals to the at least one digital video receiver to record for time delay viewing.

The processing unit may be configured to receive additional digital video signals besides those of over the air broadcast sources. In some embodiments, the processing unit also is configured to receive digital video signals from satellite or cable sources.

The digital video receiver may be any that is configured to store at least two digital video signals from the antenna sub-system apparatus, display at least two signals or store at least one and display at least one. Digital video receivers include, for example, elements designed to display the digital video signals, elements designed to store the digital video elements for later display, or elements designed to both display one digital video signal while storing at least one digital video signal for display at a later time. Digital video receivers include, for example, cloud based storage applications; hardware based storage devices such as, for example, computers, digital video disks, databases configured for later retrieval of one or more selected digital video signal, and digital video recorders all for later retrieval of one or more selected digital video signal; and smart storage and display devices such as televisions, monitors, computers, smart phones, and computer tablets.

Other modifications and changes made to fit particular operating requirements and environments will be apparent to those with ordinary skill in the art. Thus, the invention is not considered limited to the embodiments discussed for purposes of disclosure and covers all changes and modifications that do not constitute departures from the true spirit and scope of this invention.

What is claimed is:

1. An antenna sub-system apparatus with no signal splitting elements for receiving a plurality of over the air digital broadcast television signals, comprising:

a passive antenna assembly comprising at least two antennas packaged together configured so that each of the at least two antennas, independently, receive over the air digital broadcast television signals; and an active electronics assembly configured to communicate with the at least two antennas and a digital video receiver, the active electronics assembly comprising:
an amplifier for each antenna in communication with that antenna,
a tuner connected to each amplifier, and
a processing unit configured to be in communication with all of the tuners and configured to convey the digital video signal from each tuner independently at the same time to the digital video receiver.

2. The antenna sub-assembly apparatus of claim 1 wherein the apparatus is configured to convey an over the air television broadcast digital video signal to the digital video receiver with a resolution that is similar to that of the digital broadcast television signal just before it enters the antenna sub-assembly apparatus.

3. The antenna sub-assembly apparatus of claim 1 wherein the apparatus is configured to convey an over the air television broadcast digital video signal to the digital video receiver with a resolution that is superior to that of the digital broadcast television signal just before it enters the antenna sub-assembly apparatus.

4. The antenna sub-system apparatus of claim 1, wherein the antennas are secured together.

5. The antenna sub-assembly of claim 1 wherein the processing unit is also configured to receive digital video signals from satellite or cable sources.

6. The antenna sub-assembly of claim 1 wherein the electronic assembly is configured with connecting elements that place the electronic assembly in communication with at least one digital video receiver.

7. The antenna sub-assembly of claim 6 wherein the connecting elements are from a group consisting of Wi-Fi, High Definition Multimedia Interface (HDMI), Digital Visual Interface (DVI), Bluetooth, Thunderbolt by Apple, FireWire, Ethernet, and mesh networks.

8. The antenna sub-assembly of claim 6 wherein the digital video receiver is from the group consisting of digital video recorder, digital video diskette, computer, monitor, smart phone, software application for later retrieval, and databases for later retrieval.

9. A method of recording multiple over the air digital broadcast television signals, comprising the steps of:
  a. providing at least two over the air digital broadcast television signals;
  b. providing an antenna sub-system apparatus with no signal splitting elements for receiving a plurality of over the air digital broadcast television signals, comprising:
    i. a passive antenna assembly comprising at least two antennas packaged together and configured to receive the over the air television broadcast signals without the use of signal splitters, each antenna able to receive an independent over the air television broadcast signal and
    ii. an active electronics assembly configured to communicate with the at least two antennas and a digital video receiver and, comprising:
  an amplifier for each antenna and in communication with the antenna,
  a tuner connected to each amplifier, and
  a processing unit configured to be in communication with all tuners and configured to transmit a selected digital video signal from at least one tuner to at least one digital video receiver;
  c. providing at least one digital video receiver that is in communication with all of the tuners of the active electronic assembly;
  d. receiving at least two independent over the air digital broadcast television signals; and
  e. conveying at least one of two over the air digital broadcast television signals to the at least one digital video receiver to record for time delay viewing.

10. The method of claim 9 wherein the antenna sub-system apparatus is configured to convey an over the air television broadcast digital video signal to the digital video receiver with a resolution that is similar to that of the digital broadcast television signal just before it enters the antenna sub-assembly apparatus.

11. The method of claim 9 wherein the antenna sub-system apparatus is configured to convey an over the air television broadcast digital video signal to the digital video receiver with a resolution that is superior to that of the digital broadcast television signal just before it enters the antenna sub-assembly apparatus.

12. The method of claim 9 wherein the processing unit is further configured to receive digital video signals from satellite or cable sources.

13. The method of claim 9 wherein the digital video receiver is from a group consisting of cloud based storage applications, hardware based storage devices, and digital video recorders.

\* \* \* \* \*